(12) United States Patent
Schleweis et al.

(10) Patent No.: US 12,033,504 B2
(45) Date of Patent: Jul. 9, 2024

(54) METHOD FOR DETECTING AN OBSTACLE IN FRONT OF A VEHICLE

(71) Applicant: Robert Bosch GmbH, Stuttgart (DE)

(72) Inventors: Nico Schleweis, Donnbronn (DE); Robin Petereit, Bietigheim-Bissingen (DE); Benedikt Lehnertz, Tamm (DE); Lea Fischer, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 905 days.

(21) Appl. No.: 17/042,709

(22) PCT Filed: Mar. 29, 2019

(86) PCT No.: PCT/EP2019/058039
§ 371 (c)(1),
(2) Date: Sep. 28, 2020

(87) PCT Pub. No.: WO2019/197179
PCT Pub. Date: Oct. 17, 2019

(65) Prior Publication Data
US 2021/0142662 A1 May 13, 2021

(30) Foreign Application Priority Data
Apr. 12, 2018 (DE) .......................... 102018205532.7

(51) Int. Cl.
*G08G 1/052* (2006.01)
*G01S 13/931* (2020.01)
*G08G 1/01* (2006.01)

(52) U.S. Cl.
CPC ............ *G08G 1/052* (2013.01); *G01S 13/931* (2013.01); *G08G 1/0104* (2013.01)

(58) Field of Classification Search
CPC .... G08G 1/052; G08G 1/0104; G01S 13/931; G01S 2013/93271; G01S 2013/9273;
(Continued)

(56) References Cited

U.S. PATENT DOCUMENTS 9,840,253 B1* 12/2017 Prasad .................. B60W 30/12
10,078,355 B2* 9/2018 Eriksen ..................... G06F 1/20
(Continued)

FOREIGN PATENT DOCUMENTS

DE 19932094 A1 1/2001
DE 10255797 A1 6/2004
(Continued)

OTHER PUBLICATIONS

International Search Report for PCT/EP2019/058039, Issued Jun. 18, 2019.

*Primary Examiner* — Andrew Joseph Rudy
(74) *Attorney, Agent, or Firm* — NORTON ROSE FULBRIGHT US LLP; Gerard A. Messina

(57) ABSTRACT

A method for detecting an obstacle in front of a vehicle using a radar sensor. In the method, the radar sensor monitors a monitoring area in front of the vehicle, a classification of an object detected by the radar sensor in the monitoring area being performed, the monitoring area being divided into monitoring subareas and a first classification rule being used for classification for a first monitoring subarea and a second classification rule being used for classification for a second monitoring subarea.

9 Claims, 3 Drawing Sheets

(58) Field of Classification Search
CPC .......... G01S 7/411; G01S 7/415; G01S 13/52;
B60W 10/18; B60W 10/20; B60W 40/02;
B60W 50/0098
USPC ......................................................... 701/119
See application file for complete search history.

(56) References Cited

U.S. PATENT DOCUMENTS

| | | | | |
|---|---|---|---|---|
| 10,137,890 | B2* | 11/2018 | Sakai | G05D 1/024 |
| 10,186,039 | B2* | 1/2019 | Choi | G06T 7/13 |
| 10,929,653 | B2* | 2/2021 | Yan | G06V 40/25 |
| 11,187,787 | B2* | 11/2021 | Lee | G01S 7/4052 |
| 11,295,144 | B2* | 4/2022 | Guo | G06F 18/24323 |
| 11,885,910 | B2* | 1/2024 | Vallespi-Gonzalez | G01S 13/931 |
| 11,906,660 | B2* | 2/2024 | Wekel | G01S 17/86 |
| 11,921,210 | B2* | 3/2024 | Crouch | G06F 18/2431 |
| 2006/0267830 | A1 | 11/2006 | O'Boyle | |
| 2011/0025548 | A1 | 2/2011 | Nickolaou | |
| 2016/0161609 | A1 | 6/2016 | Tanaka et al. | |
| 2017/0309997 | A1 | 10/2017 | Alland et al. | |

FOREIGN PATENT DOCUMENTS

| | | | | |
|---|---|---|---|---|
| DE | 102006020387 A1 | 10/2007 | | |
| DE | 102008001838 A1 | 11/2009 | | |
| DE | 102009041555 A1 | 6/2010 | | |
| DE | 102010007415 A1 | 9/2010 | | |
| DE | 10 2014 216 421 A1 * | 2/2016 | ............. | H04N 5/335 |
| EP | 2808698 A2 | 12/2014 | | |

* cited by examiner

METHOD FOR DETECTING AN OBSTACLE IN FRONT OF A VEHICLE

BACKGROUND INFORMATION

In conventional methods for detecting an obstacle in front of a vehicle using a radar sensor, for obstacle classification, feature spaces are used in combination with classification methods. Features may be for example performance values, variance profiles, etc. These methods are furthermore based on a longitudinal approach of the vehicle to the object. The conventional classification algorithms are highly dependent on the installation position of the utilized radar sensor since there exists a non-deterministic dependency of the feature space on the installation parameters such as for example an installation position or even an obstruction by a vehicle emblem. Consequently, a time-consuming modification and validation of the classification algorithm is required for each vehicle model.

Conventional methods therefore have the disadvantage that a use of a radar sensor for detecting an obstacle in front of a vehicle is not possible without elaborate adaptation. The conventional methods have the disadvantage of assuming a longitudinal approach of the vehicle to the detected object so that an object detection of objects laterally with respect to the direction of movement of the vehicle is not possible or possible only with difficulty. For these reasons, the conventional methods are not suitable for detecting obstacles in front of an off-highway vehicle using a radar sensor.

SUMMARY

In accordance with an example embodiment of the present invention, a method for detecting an obstacle in front of a vehicle using a radar sensor, in which the radar sensor monitors a monitoring area in front of the vehicle, and in which a classification of an object detected by the radar sensor in the monitoring area is performed, has the advantage that the monitoring area is divided into monitoring subareas and that a first classification rule is used for classification for a first monitoring subarea and a second classification rule is used for classification for a second monitoring subarea.

Advantageous refinements of the present invention are described herein.

In accordance with an example embodiment of the present invention, it is advantageous that the first monitoring subarea extends between the radar sensor and a ground intersection line and that the second monitoring subarea extends between the ground intersection line and a maximum monitoring distance. A ground intersection line is to be understood in particular as a line that is defined by an intersection of a radar lobe of the radar sensor with the ground. In a top view onto the vehicle together with the radar sensor, the ground intersection line is thus approximatively a segment of a circle. The beams emitted by the radar sensor do not strike the ground between the vehicle and the circle segment of the ground intersection line. In the area between the ground intersection line and the maximum monitoring distance, the beams emitted by the radar sensor strike the ground.

It is advantageous that the ground intersection line is determined using the radar sensor. This makes it possible to implement a self-calibrating method. In a particularly advantageous development, the area in front of the vehicle is scanned by the radar sensor and the ground intersection line is determined by localizing the radar reflections emanating from the ground. The area in which it is possible to localize ground reflections then forms the area between the ground intersection line and the maximum monitoring distance so that the delimitation of this area toward the radar sensor is represented by the ground intersection line.

It is advantageous that the first classification rule is independent of an intrinsic speed of the object detected in the monitoring area. In a particularly advantageous development, the first classification rule is thus a rule that says that both moving as well as stationary objects are classified as obstacles.

It is advantageous that the second classification rule comprises classifying the object detected in the monitoring area as a function of an intrinsic speed of the object detected in the monitoring area. In a particularly advantageous development, the second classification rule comprises classifying only moving objects as obstacles. This allows for a robust differentiation between an obstacle and a ground reflection.

It is advantageous that the second classification rule comprises classifying the object detected in the monitoring area as an obstacle if using the radar sensor it is recognized that the object detected in the monitoring area has an intrinsic speed that differs from zero or that it had such an intrinsic speed at an earlier point in time. An earlier point in time is in this case in particular a preceding measuring cycle. Objects are thus classified as obstacles that move or that moved at an earlier point in time, that is, in a preceding measuring cycle. In a particularly advantageous development, objects that moved during an earlier measuring cycle are classified as obstacles only if the objects are registered in every measuring cycle between a current measuring cycle and the past measuring cycle in which the respective object was first classified as an obstacle. In other words, in this advantageous development, objects are classified as obstacles only if they can be identified in every measuring cycle without interruption since a first detection as a moving object.

It is advantageous if the vehicle is an off-highway vehicle. In the application of the method according to the present invention in connection with an off-highway vehicle, use may be made in a particularly advantageous manner of the fact that the method of the present invention provides a method that does not require adaptation and that thus makes it possible to install a radar sensor at nearly any location on the off-highway vehicle and to begin operation directly. When using the method of the present invention in connection with an off-highway vehicle, use may also advantageously be made of the fact that the method of the present invention is a method that is very robust with respect to the occurrence of ground reflections of varying strengths so that the method of the present invention may be used in particular advantageously for construction site vehicles or agricultural machinery. Construction site vehicles or agricultural machines typically drive on grounds that are very uneven and that may therefore cause very strong ground reflections.

In accordance with an example embodiment of the present invention, a device is provided that is designed to perform every step of the method of the present invention.

In accordance with an example embodiment of the present invention, a computer program is provided that prompts a control unit to perform every step of the method of the present invention when the computer program is executed on the control unit. Furthermore, a storage medium is advantageous, on which the computer program is stored.

An exemplary embodiment of the present invention is presented in more detail below.

DETAILED DESCRIPTION OF EXAMPLE EMBODIMENTS

Figure 1:
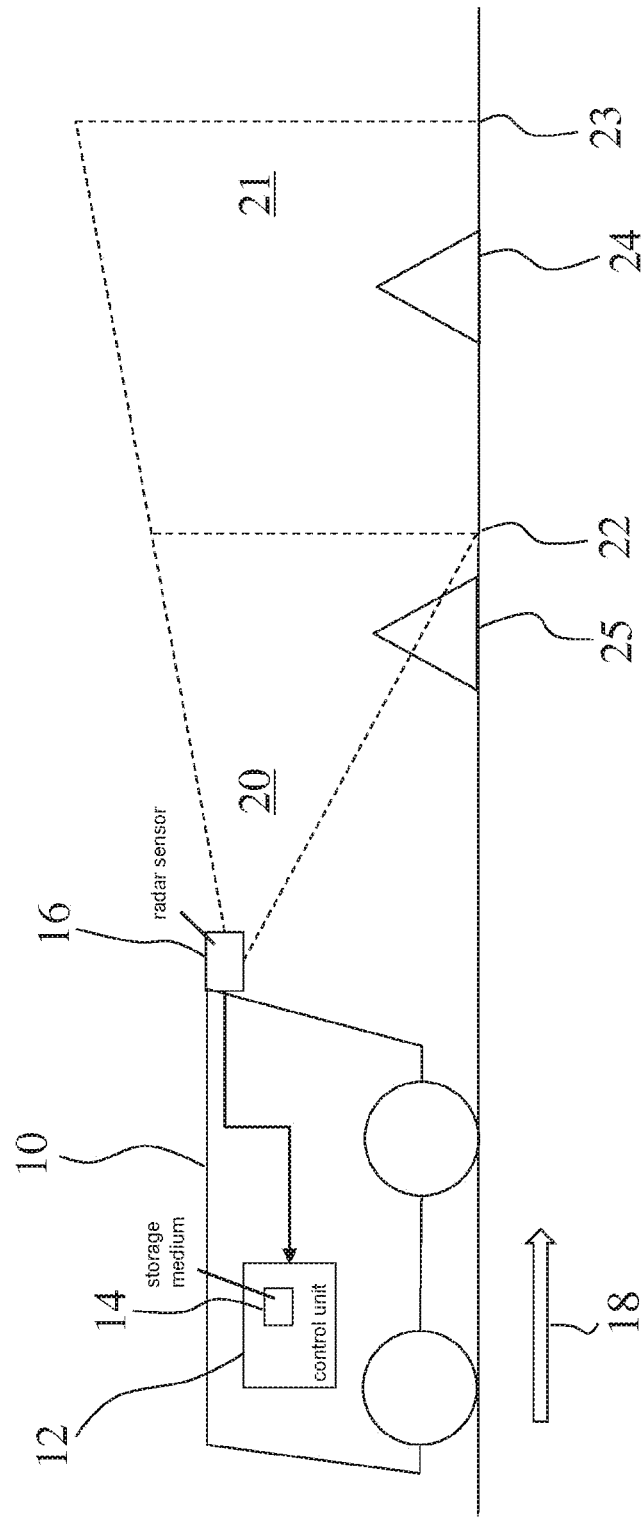
FIG. 1 shows a schematic representation of a vehicle, which comprises a device for implementing an exemplary embodiment of the method of the present invention.

FIG. 1 shows a schematic representation of a vehicle (10), which comprises a device, which is designed for implementing an exemplary embodiment of the method according to the present invention. The vehicle (10) may be in particular an off-highway vehicle, in particular an agricultural machine or a construction vehicle. The vehicle (10) comprises a control unit (12), which in turn comprises a storage medium (14). The vehicle (10) also comprises a radar sensor (16). The radar sensor (16) is situated on vehicle (10) so as to make it possible to monitor an area in front of the vehicle (10) for the presence of obstacles. Radar sensor (16) is also situated on vehicle (10) so as to make it possible to divide a monitoring area (20, 21) into two monitoring subareas. A first monitoring subarea (20) comprises the area between radar sensor (16) and a ground intersection line (22), the ground intersection line being defined in that in the area of the ground intersection line the radar lobe of radar sensor (16) touches the ground. The monitoring area further comprises a second monitoring subarea (21), which extends from ground intersection line (22) to a maximum monitoring distance (23). Radar sensor (16) is designed so as to make it possible to classify objects (24, 25) detected with the aid of radar sensor (16) so that as a result of the classification a detected object (24, 25) is recognized, if indicated, as an obstacle and that a corresponding reaction, for example the output of a warning, is initiated. A direction of travel of vehicle (10) is indicated by arrow (18).

Figure 2:
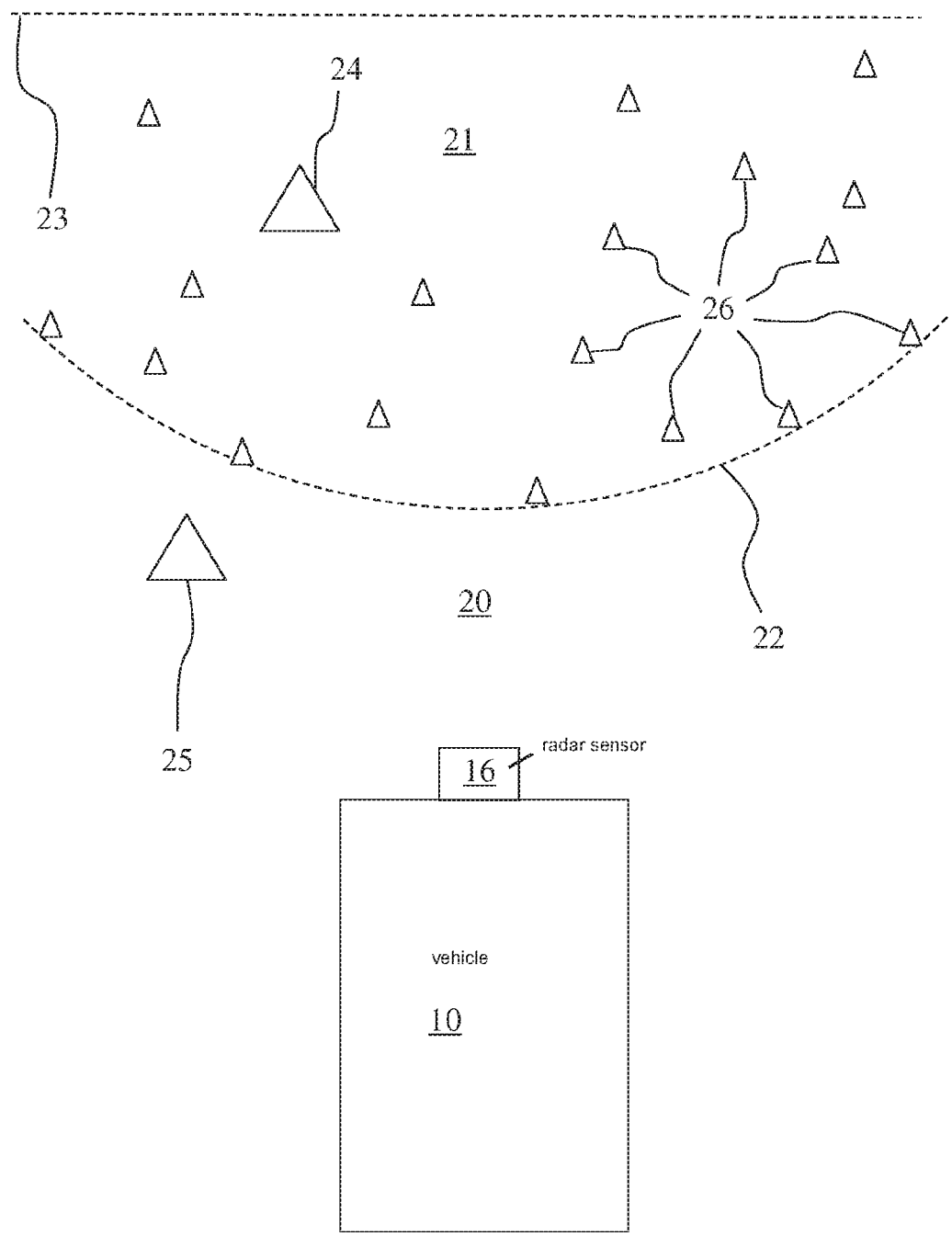
FIG. 2 shows a schematic top view onto the vehicle.

FIG. 2 shows a schematic top view onto the vehicle (10) shown in FIG. 1. FIG. 2 serves better to illustrate the definition of the ground intersection line (22), which in the top view approximatively has the form of a segment of a circle. The reference numerals already described in the description of FIG. 1 are here not described anew. The radar lobe of radar sensor (16) strikes the ground in the second monitoring subarea (21) so that a plurality of ground reflections (26) are detected in second monitoring subarea (21). For reasons of clarity, not all ground reflections are labeled with reference numerals. A line that is approximatively circle segment-shaped when the ground is level, which delimits the ground reflections (26) toward vehicle (10), defines ground intersection line (22).

Figure 3:
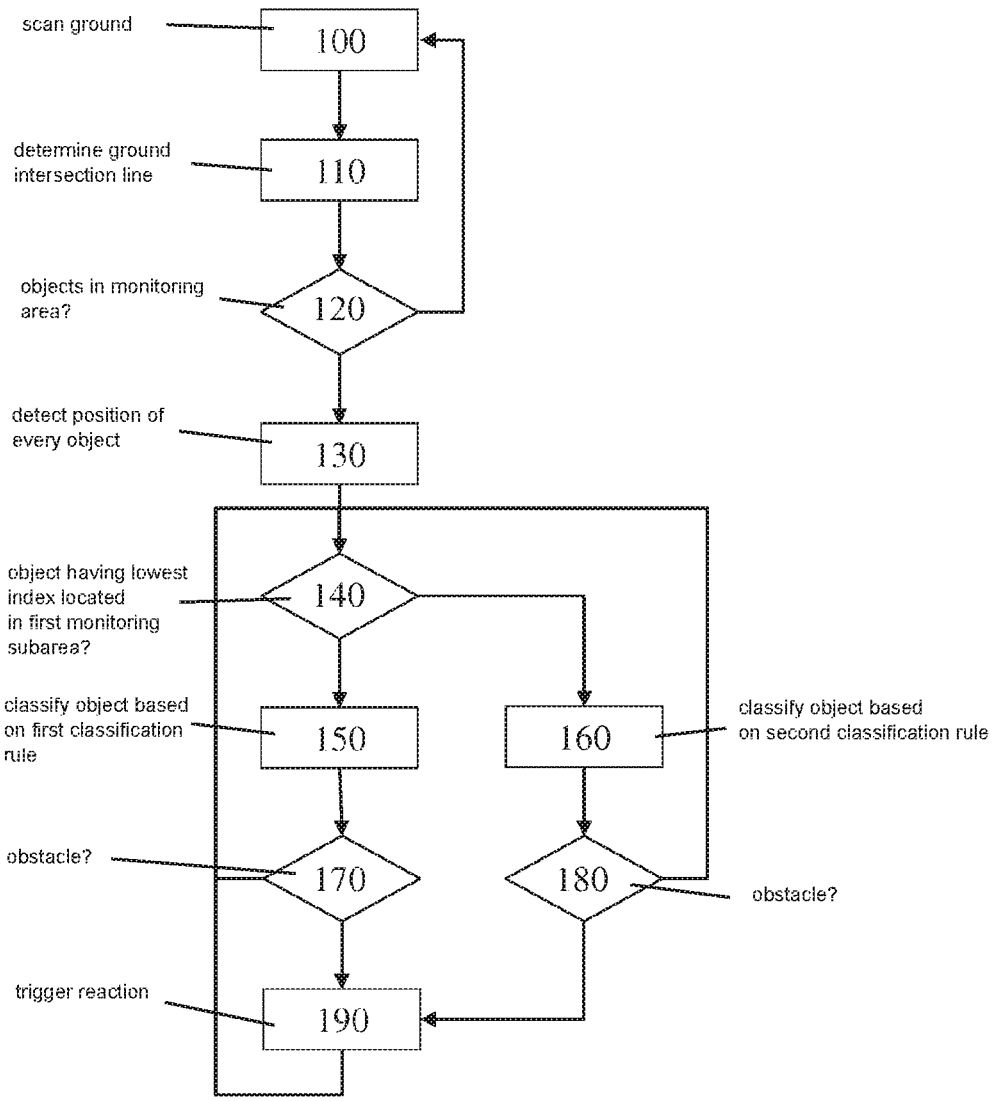
FIG. 3 shows a schematic representation of the sequence of an exemplary embodiment of the method of the present invention.

FIG. 3 shows a schematic sequence of an exemplary embodiment of the method according to the present invention. The exemplary embodiment illustrated in FIG. 3 starts with step 100. In step 100, the ground in front of vehicle (10) is scanned using radar sensor (16). This is followed by step 110.

In step 110, the ground intersection line (22) is determined on the basis of the radar reflections received in step 100. For this purpose, a line is defined that delimits the ground reflections (26) detected in step 100 toward the vehicle (10). Subsequently, a step 120 is performed. In an alternative development, the position of the ground intersection line (22) is read out from a storage device. In this alternative development, the ground intersection line (22) is previously determined from an installation height, a viewing angle and an inclination of radar sensor (16) and is stored in the storage device.

A check is performed in step 120 to determine whether objects (24, 25) exist in the monitoring area (20, 21). In other words, a check is performed in step 120 to determine whether radar reflections exist in the monitoring area (20, 21), which were not identified clearly as ground reflections (26). If no objects (24, 25) exist in the monitoring area, step 120 is followed once more by step 100. If objects (24, 25) exist in the monitoring area, step 120 is followed by step 130.

In step 130, the position of every object (24, 25) detected in step 120 is determined. Furthermore, every object (24, 25) detected in step 120 is provided with a distinct index. Subsequently, step 140 is performed.

In step 140, a check is performed to determine whether the object (24, 25) having the lowest index is located in the first monitoring subarea (20). If the object (24) having the checked index is not located in the first monitoring subarea (20), step 160 is performed subsequently. If the object (25) is located in first monitoring subarea (20), step 140 is followed by step 150.

In step 150, the object (25) having the current index is classified on the basis of the first classification rule. The first classification rule provides for classifying every object (25) as an obstacle whose radar echo exceeds a specifiable threshold value. An intrinsic speed of the object (25) to be classified is not take into account in connection with the first classification rule. Following step 150, step 170 is performed.

A check is performed in step 170 to determine whether the object (25) classified in step 150 is an obstacle. If it is an obstacle, step 190 is performed subsequent to step 170. If it is not an obstacle, step 140 is performed once more subsequent to step 170. In the renewed performance of step 140, the index is incremented.

In step 190, a reaction is triggered by the detected obstacle. This reaction may be for example an optical or acoustic warning, which is brought to the attention of a user of vehicle (10). The reaction in connection with step 190 may also be an automatic intervention into the operation of vehicle (10), for example an emergency braking action.

In step 160, the object to be checked is classified on the basis of the second classification rule. The second classification rule provides for classifying an object (24) as an obstacle only if the object (24) has an intrinsic speed other than zero or if it had an intrinsic speed other than zero in an earlier cycle of the exemplary embodiment of the method of the present invention. In an advantageous development, a stationary object (24) is classified as an obstacle in connection with the second classification rule only if the object (24) stationary in the current cycle of the method of the present invention was previously detected in each of the previously run-through cycles since the first cycle, in which the object had an intrinsic speed other than zero. Subsequently, step 180 is performed.

In step 180, a check is performed to determine whether or not the object (24) classified in step 160 represents an obstacle. If the object classified in step 160 is an obstacle, step 190 is performed subsequent to step 180. If the object

(24) is not an obstacle, step 180 is followed once more by step 140, the index being incremented in a renewed performance of step 140.

The presented exemplary embodiment of the method according to the present invention is repeated cyclically (not shown in FIG. 3) so that the ground intersection line (22) is constantly updated.

The presented exemplary embodiment of the method according to the present invention thus allows for a reliable detection of obstacles with the aid of a radar sensor (16), which does not have to be calibrated following its installation in a vehicle (10), but which calibrates itself by the detection of the ground intersection line (22) and the subsequent division of the monitoring area into a first monitoring subarea (20) and a second monitoring subarea (21).

What is claimed is:

1. A method for detecting an obstacle in front of a vehicle using a radar sensor, the method comprising the following steps:
   monitoring, using the radar sensor, a monitoring area in front of the vehicle; and
   classifying an object detected in the monitoring area using the radar sensor;
   wherein the monitoring area is divided into monitoring subareas, and wherein, in the classifying step, a first classification rule is used only for the classification for a first monitoring subarea of the subareas, and a second classification rule is used only for the classification for a second monitoring subarea of the subareas.

2. The method as recited in claim 1, wherein the first monitoring subarea extends between the radar sensor and a ground intersection line, and the second monitoring subarea extends between the ground intersection line and a maximum monitoring distance.

3. The method as recited in claim 2, wherein the ground intersection line is determined using the radar sensor.

4. The method as recited in claim 1, wherein the first classification rule is independent of an intrinsic speed of the object detected in the monitoring area.

5. The method as recited in claim 1, wherein the second classification rule includes classifying the object detected in the monitoring area as a function of an intrinsic speed of the object detected in the monitoring area.

6. The method as recited in claim 5, wherein the second classification rule includes classifying the object detected in the monitoring area as an obstacle when, using the radar sensor, it is recognized that the object detected in the monitoring area has an intrinsic speed that differs from zero or that it had such an intrinsic speed at an earlier point in time.

7. The method as recited in claim 1, wherein the vehicle is an off-highway vehicle.

8. A device configured to detect an obstacle in front of a vehicle using a radar sensor, the device configured to:
   monitor, using the radar sensor, a monitoring area in front of the vehicle; and
   classify an object detected in the monitoring area using the radar sensor;
   wherein the monitoring area is divided into monitoring subareas, and wherein, in the classifying step, a first classification rule is used only for the classification for a first monitoring subarea of the subareas, and a second classification rule is used only for the classification for a second monitoring subarea of the subareas.

9. A non-transitory storage medium on which is stored a computer program for detecting an obstacle in front of a vehicle using a radar sensor, the computer program, when executed by a computer, causing the computer to perform the following steps:
   monitoring, using the radar sensor, a monitoring area in front of the vehicle; and
   classifying an object detected in the monitoring area using the radar sensor;
   wherein the monitoring area is divided into monitoring subareas, and wherein, in the classifying step, a first classification rule is used only for the classification for a first monitoring subarea of the subareas, and a second classification rule is used only for the classification for a second monitoring subarea of the subareas.

* * * * *